(12) United States Patent
Garg et al.

(10) Patent No.: US 8,095,699 B2
(45) Date of Patent: Jan. 10, 2012

(54) METHODS AND APPARATUS FOR INTERFACING BETWEEN A HOST PROCESSOR AND A COPROCESSOR

(75) Inventors: Sachin Garg, Somerville, MA (US); Paul D. Krivacek, North Andover, MA (US)

(73) Assignee: MediaTek Inc., Hsin-Chu (TW)

( * ) Notice: Subject to any disclaimer, the term of this patent is extended or adjusted under 35 U.S.C. 154(b) by 966 days.

(21) Appl. No.: 11/542,092

(22) Filed: Sep. 29, 2006

(65) Prior Publication Data
US 2008/0155135 A1    Jun. 26, 2008

(51) Int. Cl.
*G06F 3/00* (2006.01)
(52) U.S. Cl. ........... 710/20; 710/3; 710/4; 710/7; 710/8; 710/31; 710/33; 710/62
(58) Field of Classification Search .................. 710/7, 9, 710/20, 3, 4, 8, 31, 33, 62
See application file for complete search history.

(56) References Cited

U.S. PATENT DOCUMENTS

| | | | | |
|---|---|---|---|---|
| 4,812,973 | A | | 3/1989 | Kinoshita .................... 364/200 |
| 5,416,908 | A | | 5/1995 | DiCarlo et al. ............... 395/275 |
| 5,825,784 | A | * | 10/1998 | Spaderna et al. ............. 714/724 |
| 5,925,118 | A | * | 7/1999 | Revilla et al. ................. 710/110 |
| 6,032,212 | A | * | 2/2000 | Goode et al. .................. 710/315 |
| 6,081,860 | A | * | 6/2000 | Bridges et al. ................ 710/110 |
| 6,434,650 | B1 | | 8/2002 | Morriss et al. |
| 6,674,751 | B1 | * | 1/2004 | Dittmar ......................... 370/364 |
| 6,874,044 | B1 | * | 3/2005 | Chou et al. ...................... 710/62 |
| 7,761,633 | B2 | * | 7/2010 | Devila et al. .................. 710/110 |
| 2002/0013892 | A1 | * | 1/2002 | Gorishek et al. ............. 712/227 |
| 2003/0126413 | A1 | | 7/2003 | El-Kik et al. |
| 2004/0210628 | A1 | * | 10/2004 | Inkinen et al. ................ 709/201 |
| 2004/0215857 | A1 | * | 10/2004 | Takeuchi et al. .............. 710/113 |
| 2004/0252793 | A1 | | 12/2004 | Chang |
| 2005/0164732 | A1 | | 7/2005 | Denk et al. |

(Continued)

FOREIGN PATENT DOCUMENTS

DE         43 13 190 A1    11/1993

(Continued)

OTHER PUBLICATIONS

Martinez, Ed, "Introduction to TD-SCDMA on the MRC6011 RCF Device", Freescale Semiconductor, Application Note, AN2684, Rev. 1 Nov. 2004, pp. 1-16.

(Continued)

*Primary Examiner* — Tariq Hafiz
*Assistant Examiner* — Jasjit Vidwan
(74) *Attorney, Agent, or Firm* — Fish & Richardson P.C.

(57) ABSTRACT

An interface to transfer data between a host processor and an external coprocessor is provided. The interface may operate in several write modes, in which in a first write mode the write operation is transferred across the interface in two clock cycles and in a second write mode the write operation is transferred across the interface in a single clock cycle. The interface can perform a first read operation initiated by the host processor and a second read operation initiated by the external coprocessor. The interface can include buffers to store read and write operations and clock gates to selectively gate off clock signals provided to the buffers to synchronize transfer of data into and out of the buffers. A selectable priority scheme can be modified to select between priorities that control a preference in transferring operations over the interface when both read and write operations are queued for transfer.

12 Claims, 4 Drawing Sheets

U.S. PATENT DOCUMENTS

2005/0204075 A1* 9/2005 Matsushita .................. 710/33
2006/0010188 A1 1/2006 Solomon et al.
2006/0084425 A1 4/2006 Cheng et al.
2007/0061342 A1* 3/2007 Magdeburger et al. ....... 707/100

FOREIGN PATENT DOCUMENTS

WO   WO 96/24901   8/1996

OTHER PUBLICATIONS

Siemens, "*White Paper TD-SCDMA: the Solution for TDD bands*", pp. 1-39, Mar. 2004.
Li, Bo et al., "*Recent Advances on TD-SCDMA in China*", IEEE Communications Magazine, Jan. 2005 pp. 30-37.
Vollmer Marius, et al., "*Comparative Study of Joint-Detection Techniques for TD-CDMA Based Mobile Radio Systems*", IEEE Journal on Selected Areas in Communications, vol. 19, No. 8, Aug. 2001, pp. 1461-1475.
Sheng, Chengke, et al., "*Spatial Temporal Processing in TD-SCDMA*", Motorola Freescale Semiconductor, Inc., White Paper, AN2904, Rev. 0, Sep. 2004, pp. 1-23.
Sheng, Chengke, et al., "*ZF-BLE Joint Detection for TD-SCDMA*", Motorola Freescale Semiconductor, Inc., pp. 1-20, Feb. 19, 2004.
ST Journal of System Research, Wireless Communications, vol. 1—No. 1, Feb. 2004, pp. 1-124.
European Search Report, Application No. EP 10 17 4359, 5 pages, Sep. 27, 2010.

* cited by examiner

FIG. 4 ns and Apparatus for Interfacing Between a Host Processor and a Coprocessor

FIELD OF THE INVENTION

The present invention relates to an interface between a host processor and coprocessor, and more particularly, to an interface between an internal bus of the host processor and external coprocessor.

BACKGROUND OF INVENTION

In the design of a processing system including, for example, a digital signal processor (DSP) chip, it may be beneficial to have access to functionality, computing power and/or specialized tasks not implemented on the DSP chip. For example, the DSP may be a wireless baseband intended to support various standards for wireless communications. However, the baseband platform may need to be modified to add support for new and/or different standards. For example, in the wireless context, a baseband processor may need to support global system for mobile communications (GSM), enhanced data GSM environment (EDGE), time division multiple access (TDMA), wideband TDMA, general packet radio service (GPRS), and other standards, and may need to be modified to support, for example, TDSCMA, other third generation (3G) standards, or standards to be developed in the future.

The additional hardware needed to extend the baseband processor to support one standard may not be necessary to support another standard, or may not be mature enough to merit incorporation into the baseband architecture. To address this, specialized hardware to support a particular standard and/or specific accelerators or optimizations not available on the baseband processor may be implemented on an external coprocessor (e.g., a coprocessor provided external to the baseband chip). As new standards or capabilities arise, a specialized coprocessor may be designed to implement the desired functionality without requiring specialized modifications and/or additions to the DSP itself (i.e., without modifying the core DSP integrated on the chip).

In addition, it may benefit a particular processing application for the DSP to be capable of utilizing other functionality that is not resident on the DSP chip. For example, various hardware accelerators, specialized filtering components, noise reduction algorithms, and other signal processing capabilities may benefit the DSP, which itself does not implement the specific functionality desired. Accordingly, various design situations may benefit from a system architecture having a DSP capable of communicating with an external coprocessor in order to take advantage of the functionality provided by the external coprocessor.

To interface between a DSP and a coprocessor, information must be transferred from a bus internal to the DSP to a bus internal to the coprocessor. That is, data must typically be transferred and obtained from off-chip. Numerous bus interface standards exist, such as Universal Serial Bus (USB), PCI Express, PCI-X, RapidIO, etc., establishing various protocols for serial and parallel bus transfers. However, these standards were developed with particular design considerations and having specific goals and priorities, and therefore may be unsuitable for the interfacing between a DSP and a coprocessor.

SUMMARY OF THE INVENTION

One embodiment according to the present invention includes an interface implemented on a host processor and adapted to transfer data between the host processor and an external coprocessor, the interface comprising a write buffer configured to store a plurality of write addresses associated with locations on the coprocessor and to store write data to be written to the plurality of write addresses, a plurality of externally accessible connections to support a plurality of physical lines for electrically connecting the host processor to the coprocessor over which the write addresses and write data may be transferred, and a synchronization component adapted to transfer data from the write buffer to the plurality of externally accessible connections according to a clock, the synchronization component configured to transfer a write address stored in the write buffer to the plurality of externally accessible connections on a first clock cycle of a write operation and to transfer associated write data stored in the write buffer to the plurality of externally accessible connections on a second clock cycle of the write operation when in a first write mode, and the synchronization component configured to transfer the write data stored in the write buffer to the plurality of externally accessible connections on the first clock cycle when in a second write mode.

Another embodiment according to the present invention includes an interface implemented on a coprocessor and adapted to transfer data between a host processor and the coprocessor, the interface comprising a write buffer configured to store write addresses associated with locations on the coprocessor and write data to be written to the write addresses, a plurality of externally accessible connections to support a plurality of physical lines for electrically connecting the host processor to the coprocessor over which the write addresses and write data may be transferred, and a synchronization component adapted to transfer data from the plurality of externally accessible connections to the write buffer according to a clock, the synchronization component configured to transfer a write address received from the plurality of externally accessible connections to the write buffer on a first clock cycle of a write operation and to transfer associated write data received from the plurality of externally accessible connections to the write buffer on a second clock cycle of the write operation when in a first write mode, and the synchronization component configured to transfer the write data received from the plurality of externally accessible connections to the write buffer on the first clock cycle when in a second write mode.

Another embodiment according to the present invention includes an interface adapted to transfer data between a host processor and an external coprocessor, the interface comprising a master-side interface implemented on the host processor, and a slave-side interface implemented on the coprocessor, wherein the master-side interface is configured to transfer information to and from a host processor bus internal to the host processor and the slave-side interface, and the slave-side interface is configured to transfer information to and from the master-side interface and a coprocessor bus internal to the coprocessor, the interface adapted to perform a first read operation initiated by the master-side interface and a second read operation initiated by the slave-side interface.

Another embodiment according to the present invention includes an interface adapted to transfer data between a host processor and an external coprocessor, the interface configured to perform at least one type of write operation and at least one type of read operation, the interface comprising a plurality of physical lines connecting the host processor and the coprocessor over which information may be transferred, at least one write buffer to store write information associated with a plurality of write operations, at least one read buffer to store read information associated with a plurality of read operations, a synchronization component coupled to the plurality of write buffers and the plurality of read buffers, the synchronization component adapted to transfer the write information and read information over the plurality of physical lines, and a priority register to store a value indicating one of a plurality of priority schemes controlling the order in which the synchronization component transfers the write information and the read information over the plurality of physical lines when more than one of the at least one write buffer and the at least one read buffer contain write information and read information to transfer, respectively.

Another embodiment according to the present invention includes a method of transferring data between a host processor and an external coprocessor, the host processor having a master-side interface adapted and the coprocessor having a slave-side interface, the method comprising acts of, when performing a first read operation, performing acts of transferring information, via the master-side interface, to and from a host processor bus internal to the host processor and the slave-side interface, and transferring information, via the slave-side interface, to and from the master-side interface and a coprocessor bus internal to the coprocessor, wherein the first read operation is initiated by the master-side interface. The method further comprising acts of, when performing a second read operation, performing acts of transferring information, via the slave-side interface, from the coprocessor bus to the master-side interface, and transferring information, via the master-side interface, from the master-side interface to the host processor interface, wherein the second read operation is initiated by the slave-side interface.

Another embodiment of the present invention includes a method of transferring information associated with a write operation over an interface having a plurality of physical lines connecting a host processor and an external coprocessor, the method comprising acts of providing a clock signal to synchronize the transfer of a write operation over the physical lines, and transferring a write address over the plurality of physical lines on a first clock cycle of the write operation and transferring associated write data to the plurality of physical lines on a second clock cycle of the write operation when in a first write mode, and transferring the write data to the plurality of physical lines on the first clock cycle when in a second write mode.

Another embodiment of the present invention includes a method of transferring information associated with write operations and read operations over an interface having a plurality of physical lines connecting a host processor and an external coprocessor, the method comprising acts of queuing the write operations and read operations to be transferred over the plurality of physical lines, selecting a priority scheme from a plurality of priority schemes, each of the plurality of priority schemes indicating an order in which to transfer the write operations and read operations when at least one write operation and at least one read operation are available in the queue for transfer over the plurality of physical lines, and transferring the write operations and read operations from the queue according to the selected priority scheme.

The exemplary embodiment summarized above may be used alone or any combination, as the aspects of the invention are not limited in this respect.

DETAILED DESCRIPTION

As discussed above, there may be various reasons to employ a coprocessor external (e.g., off-chip) to a host processor (e.g., a DSP) to achieve a desired processing system. The term host processor refers herein to the main processor in a system or device. The host processor generally includes all the processing components, buses, memory and support circuitry integrated on a single chip. The term coprocessor refers to one or more processors or processing components external (i.e., off-chip) to the host processor.

A coprocessor may be designed to implement functionality that is unnecessary for other applications of the host processor (e.g., the coprocessor may implement functionality required to operate according to a particular communications standard). Providing the coprocessor functionality internal to the host processor, therefore, adds additional size, cost, complexity and power consumption for those applications that do not utilize the coprocessor functionality. Providing the coprocessor external to the host processor facilitates design flexibility and host processor generality by providing core functionality on the host processor while still permitting specialized functionality to be utilized via one or more coprocessors.

In the context of wireless communications, for example, it may not be desirable (or feasible) to continually change the design and functionality of a core baseband processor to operate according to new communications standards as they are developed, while maintaining the functionality for pre-existing and/or legacy standards. Moreover, the baseband processor may become too large, complex and expensive if each desired standard was supported and the functionality for many different applications was integrated in the host processor design. Accordingly, Applicant has appreciated that providing one or more coprocessors external to the host processor may have significant design advantages.

However, providing an external coprocessor has a number of drawbacks resulting, at least in part, from having to transfer information off-chip. In particular, data transfers between the host processor and the coprocessor incur latencies resulting from transferring information over the interface, typically through one or more asynchronous clock domains. For some operations, such latencies may cause the host processor bus to stall while the host processor waits for the coprocessor to complete an operation and return data to the host processor. In addition, providing an interface to communicate with an external coprocessor increases the pin count of the host processor chip. Existing conventional bus interface standards may be unsuitable for communication between a host processor (e.g., a baseband chip) and an external coprocessor. For example, conventional standards may not be designed for low power operation and therefore may be unsuitable for mobile or wireless environments where power is a limited resource.

Applicant has developed a generally low latency, low power interface adapted to transfer data between a host processor and an external coprocessor. In one embodiment, the interface on the host processor and coprocessor includes external pin connections to support the physical lines over which information is transferred, wherein both address and data transfers share the same physical lines to reduce the pin count of the interface. However, the multiplexing of the physical lines between write addresses and write data increases the number of clock cycles required to transfer the write operation over the interface.

To reduce the number of clock cycles needed to transfer a write operation (e.g., a write address and write data) over the shared physical lines, the interface is configured to operate in a plurality of write modes. In a first write mode, a write operation incurs a clock cycle to transfer the write address over the physical lines and a clock cycle to transfer the write data over the physical lines. In a second mode, the write operation incurs a clock cycle to transfer the write data over the physical lines and the write address is inferred from a previous write operation, thus obviating the need to transfer the write address over the physical lines connecting the host processor and the coprocessor. Thus, a clock cycle is saved for each write operation performed in the second mode.

One drawback of utilizing an external coprocessor is that operations involving the coprocessor often causing the internal bus of the host processor to stall. For example, a host processor must often wait for data to be returned from an external coprocessor before further processing can continue. Accordingly, such read operations tend to be relatively high latency operations causing relatively significant bus stalls. Applicant has appreciated that latency and bus stalls may be reduced by an interface configured to perform a plurality of different types of read operations.

In one embodiment, a first type of read operation is initiated by the host processor and is performed by propagating a read address through the interface, the read address being processed by the coprocessor which returns data associated with the read address back through the interface. A second type of read operation is initiated by the coprocessor, which sends a block of data through the interface to the host processor, and the interface alerts the host processor that data is available to be read. From the perspective of the host processor, the second type of read operation requires only a single clock cycle of the clock synchronizing the internal host processor bus.

The various write and read operations performed over an interface between a host processor and a coprocessor are often respectively queued in buffers and transferred over the interface according to a first in first out (FIFO) priority. That is, the various write operations are transferred according to FIFO priority and the various read operations are performed according to a FIFO priority. As discussed above, typical read operations tend to incur relatively significant bus stalls. Applicant has appreciated that by configuring the interface to transfer read operations before write operations when one or more of both operations are present in the queue, bus stalls resulting from the read operation can be optimally reduced. Furthermore, Applicant has appreciated that by providing a selectable priority scheme, an interface can be customized so that read and write operations may be tailored to reduce latencies and bus stalls for a particular host processor/coprocessor combination.

Transferring data off-chip typically is performed asynchronously. Accordingly, data must be transferred across a plurality of clock domains. To achieve asynchronous transfer, buffers are often provided on both sides of the interface connecting a host processor and an external coprocessor to store data in a queue to await synchronization across the various clock domains. Accordingly, the writing into and reading from the buffers is typically synchronized by separate clocks. Providing these clock signals to each of the individual buffers requires substantial power. Applicant has appreciated that by providing a clock gate structure, clocks synchronizing transfers to and from the buffers may be gated off when the buffers are not in use, thus conserving the power needed to drive the clock signals when the clock signals are unnecessary.

In one embodiment, the interface implemented on the host processor includes a plurality of buffers, including at least one write buffer and at least one read buffer to store data to be transferred across the physical lines of the interface. The transfer of data between the internal bus of the host processor and the plurality of buffers is synchronized by a first clock signal and the transfer of data between the plurality of buffers and the physical connections of the interface between the host processor and the coprocessor is synchronized by a second clock signal. Each of the plurality of buffers has a clock gate capable of gating off at least one of the first clock signal and the second clock signal when the respective buffer is not in use to conserve power required to provide the clock signal to the buffer.

In another embodiment, each of the plurality of buffers has a first clock gate capable of independently gating off the first clock signal and a second clock gate capable of independently gating off the second clock signal automatically when the respective buffer is empty. In another embodiment, the interface includes a global clock gate configured to gate off all clocks provided to the buffers when the external coprocessor is not in use. The global clock gate may be controlled by a control register value to activate and deactivate the global clock gate.

In another embodiment, the interface implemented on the coprocessor includes a plurality of buffers, including at least one write buffer and at least one read buffer to store data to be transferred across the physical lines of the interface. The transfer between the plurality of buffers and the internal bus of the coprocessor is synchronized by a first clock signal and the transfer of data between the plurality of buffers and the physical connections of the interface is synchronized by a second clock signal. Each of the plurality of buffers has a clock gate capable of gating off at least one of the first clock signal and the second clock signal when the respective buffer is not in use to conserve power required to provide the clock signal to the buffer. In another embodiment, each of the plurality of buffers has a first clock gate capable of independently gating off the first clock signal and a second clock gate capable of independently gating off the second clock signal automatically when the respective buffer is empty.

Following below are more detailed descriptions of various concepts related to, and embodiments of, methods and apparatus according to the present invention. It should be appreciated that various aspects of the invention described herein may be implemented in any of numerous ways. Examples of specific implementations are provided herein for illustrative purposes only. In particular, any of various processor implementations and configurations may be used, as the aspects of the invention are not limited to any particular type of host processor or coprocessor design.

Figure 1:
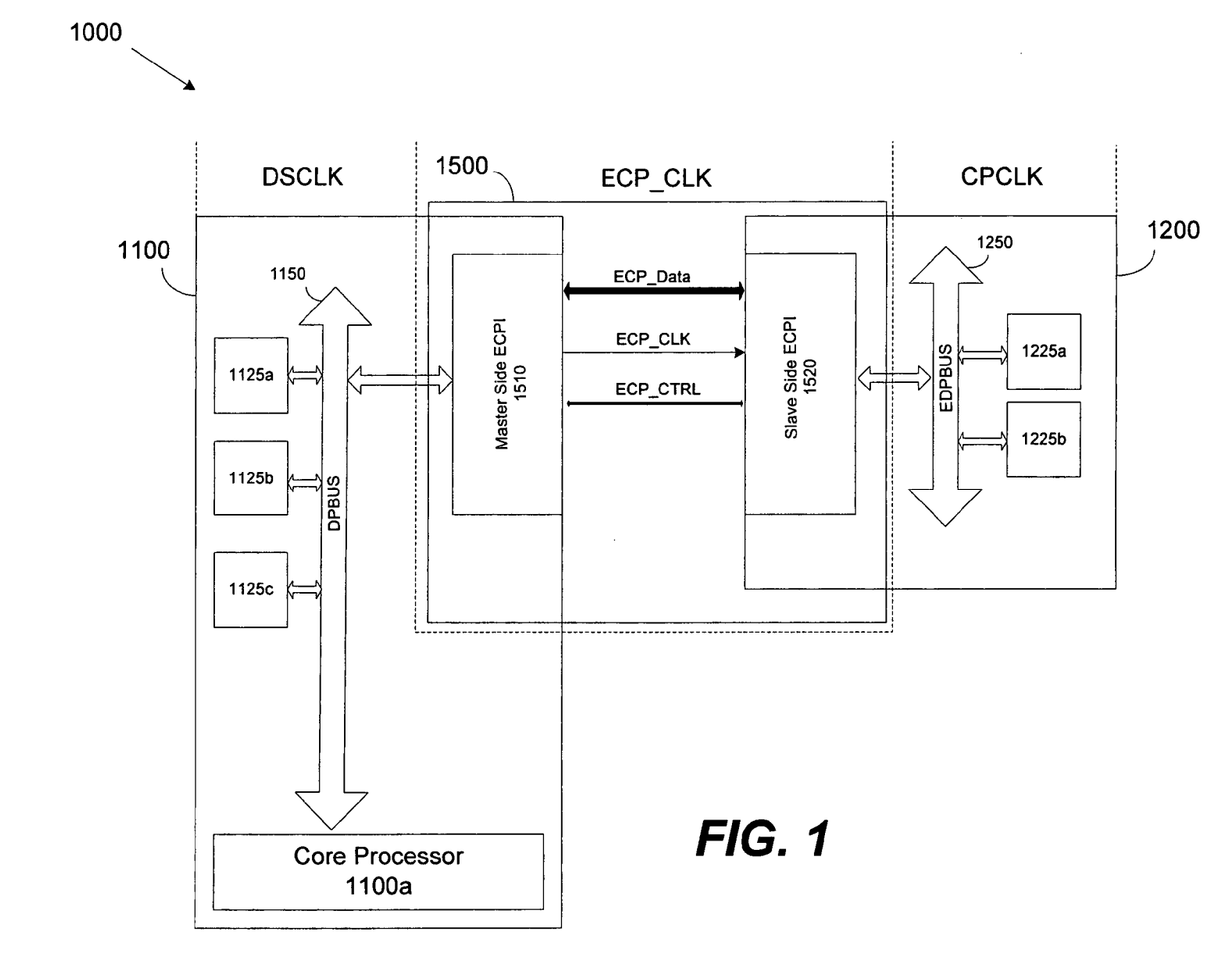
FIG. 1 illustrates a processing system including a host processor, an external coprocessor and an external coprocessor interface (ECPI) configured to transfer data between the host processor and the coprocessor, in accordance with one embodiment of the present invention.

FIG. 1 illustrates a block representation of a system implementing an interface between a host processor and a coprocessor, in accordance with one embodiment of the invention. System 1000 includes a host processor 1100 adapted for use as the main processor in the system. For example, host processor 1100 may be a digital signal processor configured to perform a number of desired processing tasks. In one embodiment, host processor 1100 is a baseband processor designed for wireless communications, e.g., a wireless baseband processor in a mobile communications device such as a cellular telephone. However, host processor 1100 may be a processor of any type, as the aspects of the invention are not limited in this respect.

Host processor 1100 includes a main digital processor bus (DPBUS) 1150 over which a number of components transfer information and otherwise communicate with the host core processor 1100*a*. For example, components 1125*a*, 1125*b*, 1125*c* may be connected to DPBUS 105 to assist in performing the processing tasks of the host processor. For example, host processor 1100 may be a digital baseband processor and component 1125*a* may be a viterbi module for implementing error correction on incoming signals, component 1125*b* may be one or more cipher components, and component 1125*c* may be one or more filter units, hardware accelerators, etc. It should be appreciated that components 1125 are merely exemplary and used to illustrate that DPBUS 1105 is shared between a plurality of components to communicate with the core processor and may be of any type or number, as the aspects of the invention are not limited in this respect.

System 1000 includes coprocessor 1200 that implements functionality beneficial to host processor 1100. For example, coprocessor 1200 may be designed to operate according to a desired communications standard and may therefore may be used in conjunction with host processor 1100 to extend the functionality and/or compatibility of the host processor. Coprocessor may include various accelerators and/or optimizations required to operate in accordance with a particular standard, or to comply with various performance requirements. Alternately, coprocessor may be an auxiliary processor to handle various processing tasks in conjunction with the core processor. The coprocessor may be any external processor having any number of components or modules, and implementing any type of functionality, as the aspects of the invention are not limited in this respect.

Coprocessor 1200 includes a data processing bus (EDPBUS) 1250 for transferring data between the various components and/or processing units that comprise the coprocessor. Coprocessor may include any number of components 1225 that communicate over EDPBUS 1250. For example, coprocessor 1200 may include component 1225*a* and component 1225*b* that perform specialized functions for the coprocessor, such as any of various processing tasks, hardware accelerations, filtering operations, etc. It should be appreciated that coprocessor may include any number of components that perform any desired processing functions, as the aspects of the invention are not limited in this respect.

System 1000 also includes external coprocessor interface (ECPI) 1500 adapted to transfer information between host processor 1100 and coprocessor 1200. ECPI 1500 includes a master-side ECPI 1510 on host processor 1100 and slave-side ECPI 1520 on coprocessor 1200, to control the transfer of information between the host processor and the coprocessor. In general, host processor 1100 and coprocessor 1200 operate asynchronously, i.e., the processors do not share a single clock and may be operating at different clock frequencies. Host processor 1200 may operate using a system clock DSCLK that, amongst other things, coordinates reading from and writing to DPBUS 1150. Similarly, coprocessor 1200 may operate using a system clock CPCLK that coordinates reading from and writing to EDPBUS 1250.

The ECPI may include an additional clock ECP_CLK to synchronize transfer of information over the physical connections between the host processor to the coprocessor. In particular, ECP_CLK may be shared by the master-side ECPI and the slave-side ECPI to coordinate transfer of information over the physical lines ECP_Data. Control lines ECP_CTRL are used to implement various control functions related to the transfer of data over ECP_Data, as discussed in further detail below. ECP_Data and ECP_CTRL may connect at pins provided on the host processor chip and the coprocessor chip, respectively.

Ideally, host processor 1100 and coprocessor 1200 would communicate as if coprocessor 1200 were directly connected to DPBUS 1150. That is, the coprocessor would appear as if it were one of the components 1125 directly connected to the DPBUS. However, since information must be transferred externally through multiple clock domains, the interface cannot be entirely transparent. However, Applicant has developed an interface optimized for generally low power, low latency transfer of information between the host processor and the coprocessor. Various aspects the interface are described in further detail below.

Figure 2:
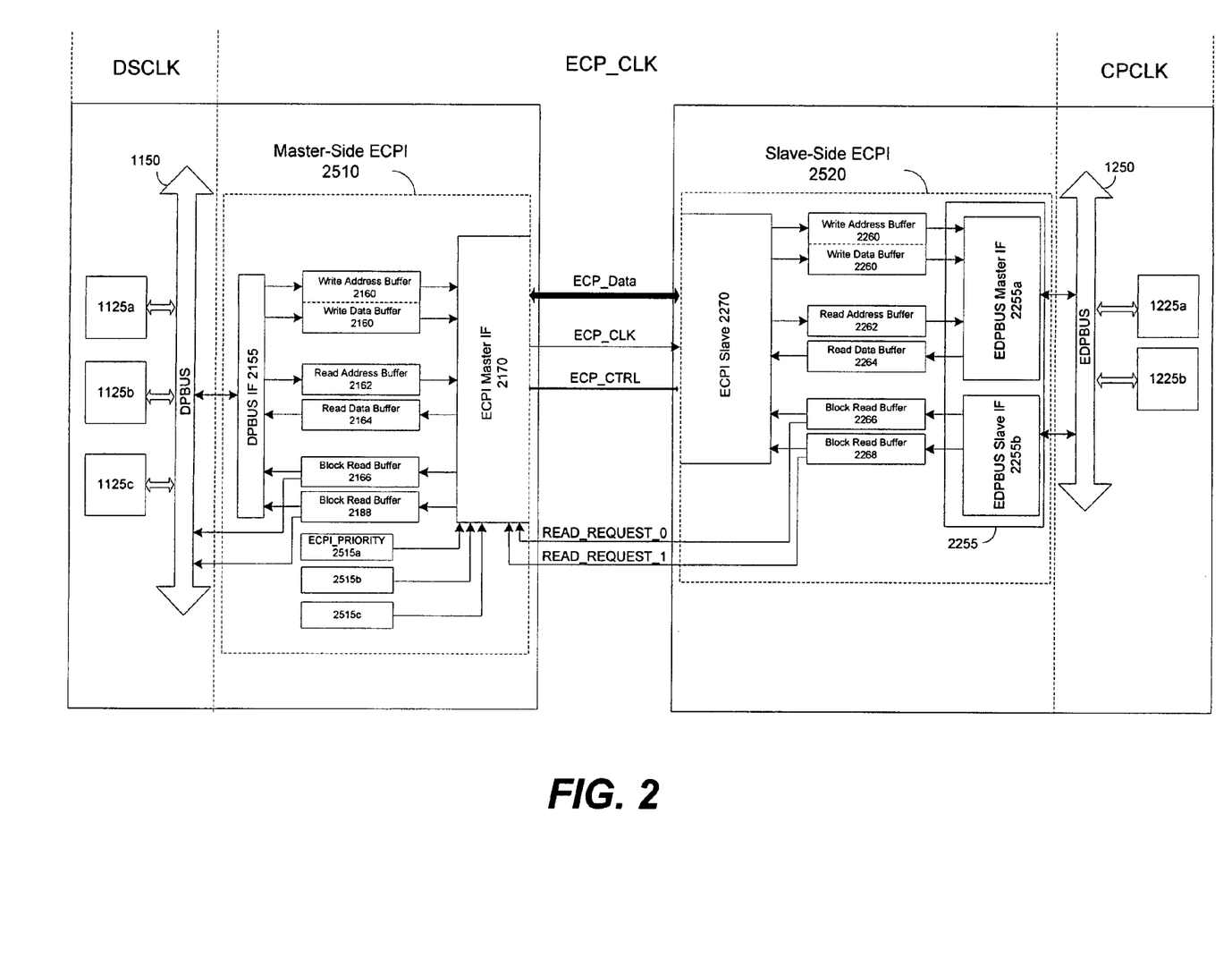
FIG. 2 illustrates various aspects of one embodiment of the ECPI of the processing system illustrated in FIG. 1.

FIG. 2 illustrates a processing system including an external coprocessor interface (ECPI), in accordance with one embodiment of the present invention. The ECPI illustrated in FIG. 2 is one embodiment of ECPI 1500 shown in FIG. 1. For example, master-side ECPI 2510 and slave-side ECPI 2520 may perform the similar function of the master-side ECPI 1510 and slave-side ECPI 1520 illustrated in FIG. 1. Master-side ECPI 2510 is coupled to DPBUS 1150 via DPBUS interface (IF) 2155. DPBUS IF 2155 includes circuitry adapted to read and write information from the DPBUS. Similarly, slave-side ECPI 2520 is coupled to EDPBUS 1250 via EDPBUS IF 2255 to allow read and write operations to be performed to and from the EDPBUS. EDPBUS IF 2255 includes an EDPBUS master IF 2255*a* and EDPBUS slave IF 2255*b* to perform various read and write operations, as discussed in further detail below.

DPBUS IF 2155 operates as a synchronization component between the DSCLK domain and the ECP_CLK domain by synchronizing transfers of data to and from the DPBUS and the plurality of buffers 216x on the master-side of the interface. ECPI Master IF 2170 operates as a synchronization component between the plurality of buffers and the slave-side of the interface. Similarly, ECPI Slave IF 2270 operates as a synchronization component between the master-side of the interface and the plurality of buffers 226x on the slave-side of the interface. Finally, EDPBUS IF 2255 operates as a synchronization component between the ECP_CLK domain and the CPLCK domain, by synchronizing transfer of data to and from the EDPBUS 1250 and the plurality of buffers 226x on the slave-side of the interface. The various synchronization components may include one or more finite state machines (FSM) and/or other circuitry to synchronize the transfer of data. The synchronization components may be implemented in any way, as the aspects of the invention are not limited in this respect.

In the context of interface 2500, the host processor is viewed as the master and the coprocessor is viewed as the slave. Accordingly, data transfer from the host processor to the coprocessor (i.e., data bound for the coprocessor) is referred to as a write operation, and data transfer from the coprocessor to the host processor (i.e., data bound for the host processor) is referred to as a read operation. To achieve write operations, interface 2500 includes write address/data buffer 2160 on the master side and write address/data buffer 2260 on the slave side.

In one embodiment, the write address/data buffers on both sides of the interface include 16 registers, each having a width of 32 bits. The upper 16 bits (31:16) store the write address and the lower 16 bits (15:0) store the write data. The depth of 16 may be suitable for certain designs to ensure that the buffer does not fill up during operation and is not too large for implementation purposes. However, it should be appreciated that the write buffer may be of any depth and of any width and may be varied to achieve particular design goals, as the aspects of the invention are not limited in this respect.

The write operation is initiated by the host processor when it is desired to transfer data to the coprocessor. The write address and write data are transferred from the DPBUS 1150 to the write address/data buffer 2160 by the DPBUS IF 2155. In one embodiment, DPBUS is wide enough to transfer both the write address and write data simultaneously. As a result, only a single DSCLK cycle (i.e., a single clock cycle from the clock synchronizing DPBUS read and write operations) is required to perform a write operation. Thus, when the host processor wants to send data to the coprocessor but the coprocessor is not ready to immediately process the information, write buffer can store the information without stalling the DPBUS, achieving a single cycle write operation from the perspective of the DPBUS. This prevents unnecessary bus stalls and reduces the impact on the DPBUS of write operations to the coprocessor.

After the data has been queued in the write address/data buffer 2160, the ECPI master IF 2170 synchronizes the transfer of the data over the physical lines (i.e., ECP_Data) connecting the host processor and the coprocessor. ECPI slave IF 2270 then places the data in the write address/data buffer 2260 on the coprocessor side. The EDPBUS master IF 2255a then transfers the data to the EDPBUS to be sent to the appropriate module indicated by the write address. Accordingly, the write operation is propagated from the DCLCK domain to the ECP_CLK domain and ultimately to the CPCLK domain, wherein the write data is written to the write address location.

In one embodiment, ECP_Data is shared by write address and write data to reduce the pin count and number of physical connections between the host processor and the coprocessor. That is, ECP_Data can accommodate either the write address or the write data on a single clock cycle, but not both simultaneously. For example, ECP_Data may have a width of 16 to match a 16-bit address space. While sharing the same physical lines for data and address transfers facilitates a significant reduction in the pin count of the interface, the resulting pin configuration prevents the address and the data from being transferred over the physical channel in a single clock cycle.

To mitigate the bandwidth reduction incurred by the extra clock cycle that results from multiplexing the address and data on the same physical lines, the interface may be configured to operate in a plurality of write modes. For example, one or more control lines may be added to instruct the interface to operate in a write mode in which the write address can be inferred, rather than physically obtained over the interface. By inferring the address, only the write data needs to be transferred over the physical lines, and only a single clock cycle is necessary to transfer a complete write operation over ECP_Data (e.g., only a single ECP_CLK cycle may be needed to process the write operation in the ECP_CLK domain).

In one embodiment, the control lines ECP_CTRL includes three control lines WRT_CTL [2:0] capable of representing eight different states. At least some of the available states are used to instruct the slave-side ECPI which of a plurality of write modes to operate in. Some the plurality of write modes instruct the slave-side ECPI that the write address for a write operation may be inferred from a previous write operation.

For example, when WRT_CTL is in a first state, the same write address previously transferred over ECP_Data may be used. Both the master-side ECPI and the slave-side ECPI store local copies of the last address transferred across ECP_Data. Thus, if the write address does not change for a subsequent write operation, WRT_CTL is set to the first state to instruct slave-side ECPI to use the write address stored locally. Thus, only the write data needs to be transferred across ECP_DATA when in this write mode, requiring only a single clock cycle to transfer the write information across the physical interface. This write mode is referred to as the write_same mode.

When CTL is in a second state, the write address previously transferred over ECP_Data and incremented by a predetermined amount may be used. For example, when the current write address is the previous write address plus n, where n is a predetermined offset value (e.g., incremented to the next addressable location in the coprocessor), WRT_CTL is set to the second state and the slave ECPI increments the locally stored write address to complete the write operation, thus eliminating the need to transfer the current write address over ECP_Data. The slave-side ECPI may then store the incremented address locally. This write mode is referred to as the write_preincrement mode.

The master-side ECPI may include a comparator that compares a last address stored locally on the master side of the interface (i.e., the locally stored value of the last address transferred over the interface) with a write address of a current write operation being transferred over the interface. If the write address is the same as the last address, master-side ECPI sets the WRT_CTL to the first state to instruct the slave-side ECPI to operate in the write_same mode. If the difference between the write address and the last address is equal to a predetermined increment value, the master-side ECPI set the WRT_CTL to the second state to instruct the slave-side ECPI to operate in the write_preincrement mode.

When WRT_CTL is in a third state (the default write mode), both the write address and the write data are transferred over ECP_Data. Together, the write_same and write_preincrement modes may significantly reduce the number of clock cycles needed to perform write operations during the operation of the host processor and coprocessor, thus improving the bandwidth of the interface and reducing the overall latency of the processor system. For example, during many operations (e.g., filter operations) large amounts of data are written to the same address (or to subsequent address spaces) over the course of thousands of write operations. Accordingly, the number of clock cycles needed to perform these write operations may be reduced by approximately half using the write_same and/or write_preincrement modes.

The registers storing the last address and the write control lines indicating the write mode in which the interface should operate in may be independent from read operations performed by the interface. Accordingly, in the event that a read operation intervenes between write operations, the write mode of the interface is preserved. When the one or more write operations commence, the last address and the current write mode are preserved so that the interface operates as if the read operation had never interrupted the one or more write operations.

To further decrease interface latency and decrease the frequency of bus stalls, interface 2500 is configured to perform a plurality of different read operations. A first type of read operation is initiated by the host processor and is performed by transferring a read address from the DPBUS to the Read Address Buffer 2162 via DPBUS IF 2155. The transfer of the read address from the Read Address Buffer 2162 is then synchronized with ECP_CLK by the ECPI master IF 2170 and transferred over physical lines ECP_Data to be queued in Read Address Buffer 2262 by ECPI slave IF 2270. EDPBUS master IF 2255a transfers the read address from the coprocessor Read Address Buffer to the EDPBUS to access the appropriate module to acquire the data stored at the read address.

To transfer the read data back to the host processor, the read data acquired from the read address is placed on the EDPBUS and queued in Read Data Buffer 2264 by EDPBUS master IF 2255a, synchronized and transferred across ECP_Data by ECPI slave IF 2270, and queued into Read Data Buffer 2164 by ECPI master IF 2170. The read data is then synchronized with and placed on the DPBUS by the DPBUS IF and transferred to the module that initiated the read. It is often the case that the host processor is unable to continue processing without the read data that it requested. As a result, the DPBUS often must stall and wait for the read data to be returned from the coprocessor before continuing other operations. Thus, the first type of read operation is a relatively high latency operation causing significant stalls on the DPBUS.

To decrease DPBUS stalls incurred by the first type of read operation, the master-side ECPI may be configured to place the highest priority on the read operation. For example, master-side ECPI 2170 may transfer data from the Read Address Buffer and to the Read Data Buffer in preference to data queued for a write operation, regardless of which data arrived first. Thus the latency is reduced to the number of clock cycles needed to complete the read operation and is not exacerbated by having to wait in the queue for earlier arrived write operations to complete before being transferred across the interface. However, other priority schemes may used, as the aspects of the invention are not limited in this respect. In one embodiment, a priority scheme may be selected from a plurality of priority schemes to customize the operation of the interface, as discussed in further detail below.

As discussed above, the first type of read operation is a relatively expensive operation with respect to latency and stalls on the DPBUS. Applicant has appreciated that if the first type of read operation were the only mechanism for acquiring data from the coprocessor, the processor system may be plagued by unacceptable operation latencies, for example, relatively high rates of stalls on the DPBUS. To address this difficulty, a second type of read operation may be implemented to reduce the frequency by which the host processor must perform the first type of read operation to obtain information from the coprocessor.

In one embodiment, the second type of read operation is initiated by the coprocessor and may be performed by having the coprocessor generate an interrupt indicating that the coprocessor has data for the host processor to read. The coprocessor may then transfer the read data via the interface to the host processor, and the host processor can read the transferred data without incurring the overhead associated with the first type of read operation.

In FIG. 2, to perform the second type of read operation, when the coprocessor has data to transfer to the host processor, EDPBUS slave IF obtains the data from EDPBUS and transfers it to one of the Block Read Buffers 2266, 2268. The ECPI master IF is notified that the coprocessor has data to be transferred to the host processor by issuing a read request signal. For example, if Block Read Buffer 2266 has data to transfer, ECP_RDREQ_0 may be set to high to alert the ECPI master IF that data is ready to be transferred. The ECPI master IF is notified rather than the ECPI slave IF because the master side of the interface controls the transfer of data over ECP_Data. Once the ECPI master IF has been notified, block read data may be transferred according to the priority scheme of the queue.

The ECPI master IF and ECPI slave IF then coordinate the transfer of the data stored in the appropriate Block Read Buffer, and the ECPI master IF stores the data in an appropriate Block Read Buffer 2166, 2168. The ECPI then signals that data is available for the host processor to read, for example, by setting ECP_RDBUF_BURST_IRQ_0 to high. The data may then be transferred to the DPBUS via the DPBUSIF. Because the second type of read operation in initiated by the coprocessor, the second type of read operation requires only a single clock cycle to complete from the perspective of the DPBUS. That is, the host processor, and more particularly the DPBUS, is shielded from the overhead associated with performing the second type of read operation, and need only interrupt operation of the DPBUS for the single clock cycle required to read the data from the corresponding Block Read Buffer.

As discussed above, to reduce some of the latency involved with performing the first type of read operation, this operation may be given priority over other operations. That is, since the DPBUS generally must wait in a stalled state while the read operation propagates through the clock domains of the interface, performing operations in strict first in first out (FIFO) order may cause further stalls of the DPBUS as the bus waits for write operations that arrived in the queue earlier to be performed. Applicant has appreciated however, that different processor systems may benefit from different priority schemes. To achieve generality in the design of the interface, Applicant has developed a selectable priority scheme configured to instruct the interface as to which operations should take priority over which when more than one buffer has data to be transferred across the interface.

In FIG. 2, the master-side ECPI includes a plurality of control registers 2515. The control registers may be made available in any number to control various aspects of the transfer of data from the buffers to ECP_Data. In one embodiment, the plurality of registers includes ECPI_PRIORITY register 2515a adapted to specify the priority in which read and write operations are transferred across the interface. ECPI_PRIORITY may be of any length to store any number of different priority schemes. Control registers 2515b and 2515c also regulate various control functions by storing values that indicate how the interface should operate. For example, the control registers may store values that indicate the state of the ECP_CTRL lines of the interface.

As discussed above, interface 2500 is adapted to perform a write operation and first and second type read operations. The first type of read operation is initiated by the host processor and propagates through the interface and back to the host processor, and is referred to as the READ operation in the context of the priority scheme described below in Table 1. The second type of read operation is initiated by the coprocessor which propagates through the interface to the host processor where an interrupt is issued to alert the host processor that there is data to read, and is referred to as the READ_REQUEST operation in the context of the priority scheme (the number indicating the corresponding Block Read Buffer).

In FIG. 2, the ECPI_PRIORITY register includes at least two bits to indicate four selectable priority schemes to be performed by the interface. Table 1 below illustrates an exemplary set of priority schemes and the associated ECPI_PRIORITY state.

TABLE 1

| ECPI_PRIORITY | Priority Scheme |
|---|---|
| 00 | READ, WRITE, READ_REQUEST0, READ_REQUEST1 |
| 01 | READ, READ_REQUEST0, READ_REQUEST1, WRITE |
| 10 | WRITE, READ_REQUEST0, READ_REQUEST1, READ |
| 11 | WRITE, READ, READ_REQUEST0, READ_REQUEST1 |

To select a priority scheme, the value stored by ECPI_PRIORITY may be set to the appropriate state. By allowing the priority scheme to be modified, the interface can be customized to suit a particular host processor/coprocessor combination. For example, a particular benefit of one priority scheme over another may be more or less important for a particular implementation and/or during a particular interval of operation. As discussed above, granting priority to the READ operation (e.g., setting ECPI_PRIORITY to 00) reduces stalls on the DPBUS, having positive impact on the bandwidth of the interface. However, preferring WRITE operations to READ operations (e.g., setting ECPI_PRIORITY to 11) preserves the instruction order of the queue.

In particular, when the write queue has one or more WRITE operations to perform and a READ operations enter the read queue, the READ operation is preferentially transferred across the interface in schemes in which the READ operation is give priority. In some instances, the preferentially transferred READ operation will read from a location that, but for the priority scheme, one or more of the WRITE operations in the queue would have written to before the READ. Thus, the value obtained from the READ operation may be different as a result of the selected priority scheme. Accordingly, the priority scheme may be selected to prefer write operations in situations in which preserving the instruction order is desired.

It should be appreciated that the priority scheme may be changed at any time during the operation of the host processor/coprocessor combination. That is, setting or changing the ECPI_PRIORITY bits can be performed while the interface is in operation (e.g., while the read and/or write queues. Accordingly, the priority scheme may be dynamically modified to, for example, prefer READ operations during tasks where bandwidth is important, and to prefer WRITE operations during tasks where instruction order is important. While ECPI_PRIORITY is shown having a pair of bits, it should be appreciated that ECPI_PRIORITY may include any number of bits necessary to store all of the priority permutations available for the various read and write operations performed by the interface, as the aspects of the invention are not limited in this respect.

While ECPI_PRIORITY is shown as a register on the master-side of the interface, it should be appreciated that the slave-side of the interface may include a register to store a selected priority scheme. For example, when the priority scheme is selected, priority bits may be set on both sides of the interface to control the priority in which read and write operations are transferred over the interface. The selectable priority scheme may be implemented in any fashion, for example, as a single register on the master-side, as separate registers on both sides of the interface, or as a control line capable of communicating the priority scheme to the slave-side of the interface, as the aspects of the invention are not limited in this respect.

In many processor environments, power consumption is a key concern. For example, digital signal processors for wireless devices such as cellular phones may be power conscious to facilitate a low power processor to extend the lifetime of the battery between charges. Power conservation is an important element rendering many conventional interface standards unsuitable for such environments and applications. In one embodiment, a low power interface is provided wherein various clock signals provided to synchronize the interface may be gated off when not needed, reducing the overall power consumption of the interface.

Figure 3:
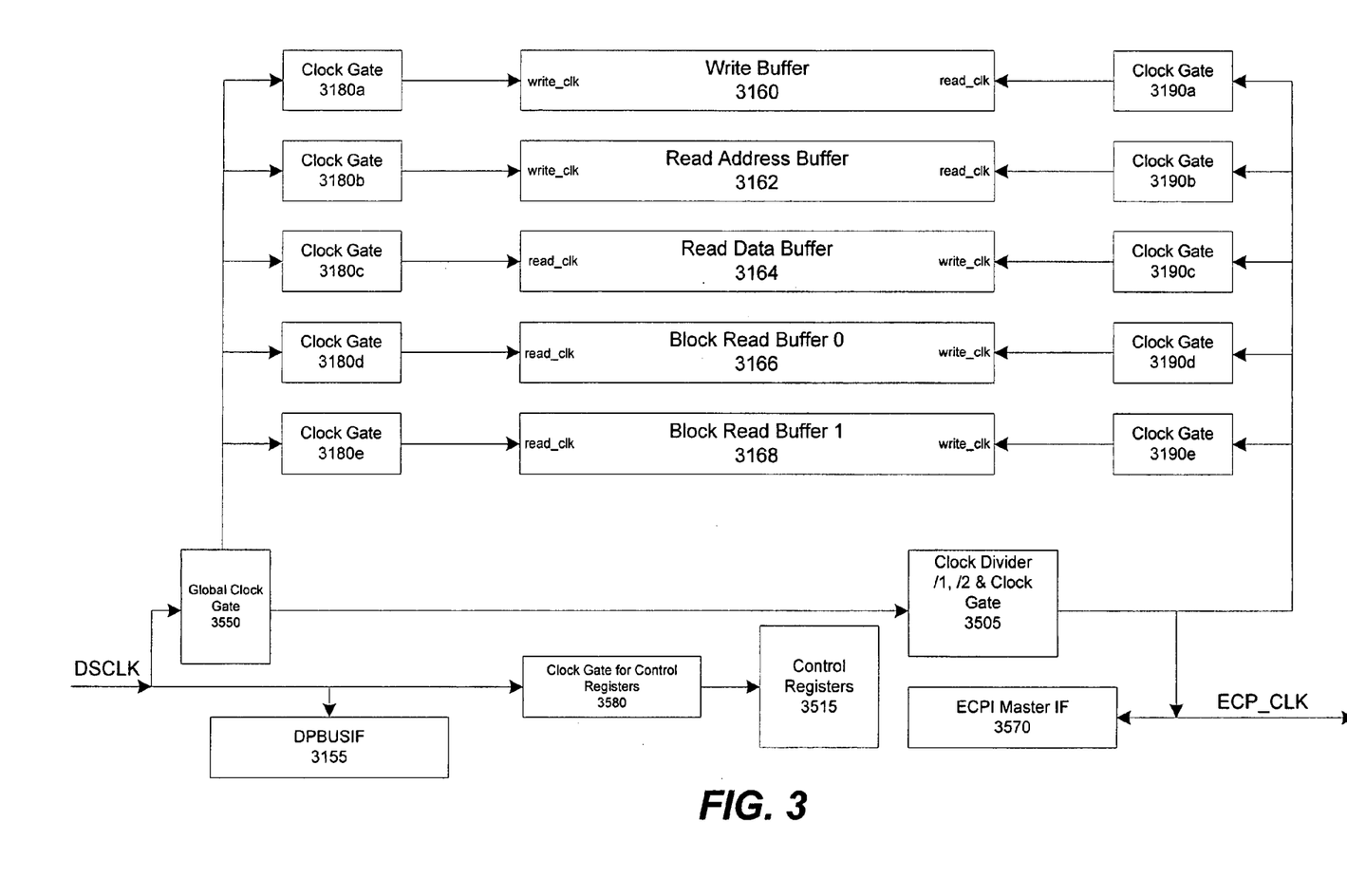
FIG. 3 illustrates a clock gating structure for gating off clock signals to a plurality of buffers comprising the master-side of an ECPI, in accordance with one embodiment of the present invention.

FIG. 3 illustrates portions of the master side of an external coprocessor interface. Specifically, buffers 3160, 3162, 3164, 3166 and 3168 correspond to the buffers 216x illustrated on the master side of the interface of FIG. 2. As discussed above, the writing to Write Buffer 3160 and Read Address Buffer 3162, and the reading from Read Data Buffer 3164 and Block Read Buffers 3166 and 3168 are synchronized by the DSCLK through DPBUS IF, and the reading from Write Buffer 3160 and Read Address Buffer 3162, and writing to Read Data Buffer 3164 and Block Read Buffers 3166 and 3168 are synchronized by ECP_CLK via the ECPI Master IF. However, if the DS_CLK and ECP_CLK were continuously provided to the read and write buffers, power consumption would be substantial.

To reduce power consumption, each of the read and write buffers 316x is provided a clock gate 3180, 3190 at both the read and write side of the buffer. The clock gates are configured to independently gate off the clock signal to the respective buffer. The clock gates 3180, 3190 may automatically gate off the clock signal when the respective buffer is empty to save the power necessary to drive the clock signals to the buffer. By providing a separate clock gate to each buffer, the clock signal can be suppressed selectively to any buffer that is empty and not currently in use and in need of a clock signal. Similarly, control registers 3515 (which may correspond to control register 2515 of FIG. 2) have a clock gate 3580 adapted to gate off DS_CLK when it is not needed to, for example, write to the control registers. Each of the clock gates may include circuitry that detects when the associated buffer is empty or not being used to automatically gate of the clock signal to the corresponding buffer.

In addition, a global clock gate 3550 may be provided that is capable of gating off the entire clock tree to the interface when the ECPI module is not being used. Global clock gate 3550 may be controlled via a portion of one of the control registers, e.g., an ECPI_CONTROL register. For example, a first bit ECPI_CONTROL[0] may be set to control whether the global clock gate is activated to gate off the clock signal from the ECPI when the coprocessor is not being used.

Figure 4:
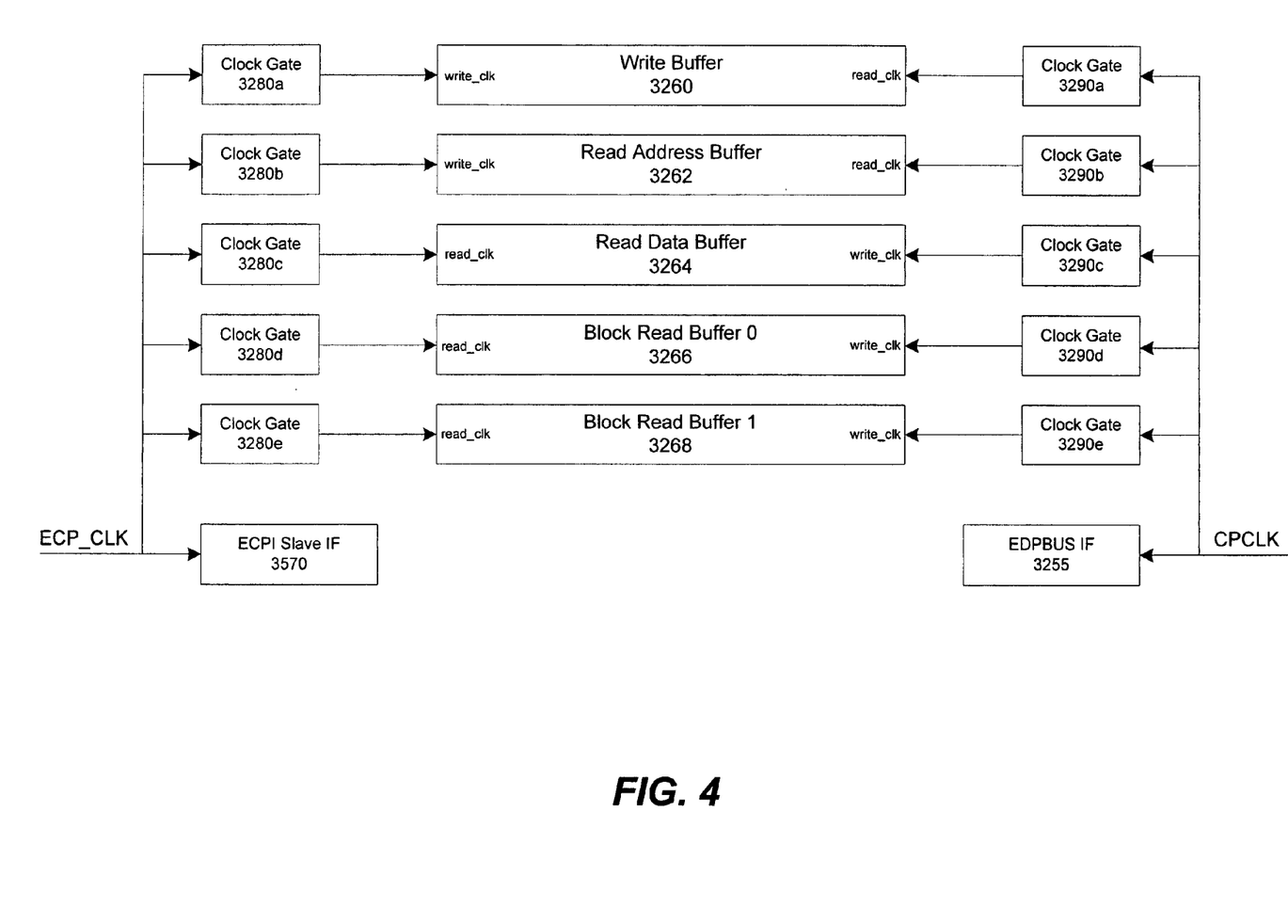
FIG. 4 illustrates a clock gating structure for gating off clock signals to a plurality of buffers comprising the slave-side of an ECPI, in accordance with one embodiment of the present invention.

FIG. 4 illustrates the corresponding clock gate structure on the slave-side of the interface. In particular, clock gates 3280, 3290 are arranged at the read and write side of the buffers 326x to independently and automatically gate off the corresponding clock signal when the respective buffer is not in use. It should be appreciated that when the global clock gate 3550 is activated, ECP_CLK will be gated off to the coprocessor to conserve power. The clock gate structures of FIG. 3 and FIG. 4 are merely exemplary, and any clock gate structure that selectively gates of clock signals to the various read and write buffers may be used, as the aspects of the invention are not limited in this respect.

The above-described embodiments of the present invention can be implemented in any of numerous ways. For example, the embodiments may be implemented using hardware, software or a combination thereof. It should be appreciated that any component or collection of components that perform the functions described above can be generically considered as one or more controllers that control the above-discussed function. The one or more controllers can be implemented in numerous ways, such as with dedicated hardware, or with general purpose hardware (e.g., one or more processor) that is programmed using microcode or software to perform the functions recited above.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, some embodiments of an interface may include one or more aspects of the invention described above and need not, but may, include each of the features described in the above embodiments. Any combination of features and/or components may be used, as the aspects of the invention are not limited in this respect.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. An interface adapted to transfer data between a host processor and an external coprocessor, the interface comprising:
    a master-side interface implemented on the host processor;
    a slave-side interface implemented on the coprocessor, the master-side interface configured to transfer information to and from a host processor bus internal to the host processor and the slave-side interface, the slave-side interface configured to transfer information to and from the master-side interface and a coprocessor bus internal to the coprocessor, and the interface adapted to perform a first read operation initiated by the master-side interface and a second read operation initiated by the slave-side interface;
    a first master-side synchronization component adapted to synchronize transfer of data to and from the host processor bus and a first master-side read buffer that stores read addresses and associated read data for use during the first read operation; and
    a second master-side synchronization component adapted to synchronize transfer of data to and from the first master-side read buffer and the slave-side interface, and to synchronize transfer of data from the slave-side interface to the second master-side read buffer that stores read data for use during the second read operation;
    a master-side write buffer configured to store a plurality of write addresses associated with locations on the coprocessor and to store write data to be written to the plurality of write addresses,
    a slave-side write buffer configured to store the write addresses and the write data;
    a plurality of physical lines for electrically connecting the host processor to the coprocessor over which the write addresses and write data may be transferred,
    wherein the second master-side synchronization component is adapted to transfer data from the master-side write buffer to the plurality of physical lines according to an interface clock shared by the master-side interface and the slave-side interface, the second master-side synchronization component configured to transfer a write address stored in the master-side write buffer to the plurality of physical lines on a first clock cycle of a write operation and to transfer associated write data stored in the write buffer to the plurality of physical lines on a second clock cycle of the write operation when in a first write mode, and the second master-side synchronization component configured to transfer the write data stored in the master-side write buffer to the plurality of physical lines on the first clock cycle when in a second write mode.

2. The interface of claim 1, wherein the second slave-side synchronization component is adapted to transfer data from the plurality of external lines to the write buffer according to the interface clock, the second slave-side synchronization component configured to transfer the write address received from the plurality of physical lines to the slave-side write buffer on the first clock cycle of the write operation and to transfer the associated write data received from the plurality of physical lines to the write buffer on the second clock cycle of the write operation when in the first write mode, and the second slave-side synchronization component configured to transfer the write data received from the plurality of physical connections to the slave-side write buffer on the first clock cycle when in the second write mode.

3. The interface of claim 2, further comprising a write control signal having a plurality of states, the plurality of states indicating whether the interface is operating in the first write mode or the second write mode.

4. The interface of claim 3, further comprising:
    a master-side address register to store a last write address transferred over the plurality of physical lines; and
    a slave-side address register to store the last write address.

5. The interface of claim 1, wherein a number of the plurality of physical lines is equal to a number of bits in each of the plurality of write addresses.

6. The interface of claim 1, further comprising:
    a plurality of master-side buffers including the master-side write buffer, the first master-side read buffer and the second master-side read buffer;
    a first clock signal to synchronize transfers of data to and from the host processor bus and at least some of the plurality of master-side buffers; and
    a second clock signal to synchronize transfers of data to and from at least some of the plurality of master-side buffers and the slave-side interface; and
    a plurality of master-side clock gates each associated with a respective one of the plurality of master-side buffers, each of the plurality of clock gates adapted to gate off at least one of the first clock signal and the second clock signal when the respective one of the plurality of master-side buffers is not in use.

7. The interface of claim 6, further comprising:
    a plurality of slave-side buffers including the slave-side write buffer, the first slave-side read buffer and the second slave-side read buffer, wherein the second clock signal synchronizes transfer of data to and from the master-side interface and at least some of the plurality of slave-side buffers;
    a third clock signal synchronizing transfer of data to and from at least some of the plurality of slave-side buffers and the coprocessor bus; and a plurality of slave-side clock gates each associated with a respective one of the plurality of slave-side buffers, each of the plurality of slave-side clock gates adapted to gate off at least one of the second clock signal and third clock signal when the respective one of the plurality of slave-side buffers is not in use.

8. The interface of claim 7, wherein the plurality of master-side clock gates include at least two master-side clock gates for each of the plurality of master-side buffers, a first of the at least two master-side clock gates for each of the plurality of master-side buffers configured to gate off the first clock signal and a second of the at least two master-side clock gates for each of the plurality of master-side buffers configured to gate off the second clock signal, and wherein the plurality of master-side clock gates are configured to independently and automatically gate off the respective clocks to the respective ones of the plurality of master-side buffers when the respective buffer is empty.

9. The interface of claim 8, wherein the plurality of slave-side clock gates include at least two slave-side clock gates for each of the plurality of slave-side buffers, a first of the at least two slave-side clock gates for each of the plurality of slave-side buffers configured to gate off the first clock signal and a second of the at least two slave-side clock gates for each of the plurality of slave-side buffers configured to gate off the second clock signal, and wherein the plurality of slave-side clock gates are configured to independently and automatically gate off the respective clocks to the respective ones of the plurality of slave-side buffers when the respective buffer is empty.

10. The interface of claim 9, further comprising a global clock gate configured to gate off the first clock signal and the second clock signal from each of plurality of master-side buffers and each of the plurality of slave-side buffers.

11. The interface of claim 10, wherein the global clock gate can be activated and deactivated by a control signal, the global clock gate being activated when none of the plurality of buffers are in use.

12. The interface of claim 1, further comprising a priority register to store a value indicating one of a plurality of priority schemes controlling the order in which the second master-side synchronization component transfers write information from the master-side write buffer to the slave-side write buffer and read information from the first master-side read buffer to the first slave-side read buffer over the plurality of physical lines when more than one of write information and read information is available to transfer.

* * * * *